US010717095B2

United States Patent
Knott et al.

(10) Patent No.: US 10,717,095 B2
(45) Date of Patent: Jul. 21, 2020

(54) END EFFECTOR FOR A ROBOT

(71) Applicants: BAE SYSTEMS PLC, London (GB); THE UNIVERSITY OF SHEFFIELD, Sheffield (GB)

(72) Inventors: Martin Knott, Lancashire (GB); Ryan Wesley Diver, Rotherham (GB)

(73) Assignees: BAE Systems plc, London (GB); The University of Sheffield, Sheffield (GB)

(*) Notice: Subject to any disclaimer, the term of this patent is extended or adjusted under 35 U.S.C. 154(b) by 47 days.

(21) Appl. No.: 16/073,452

(22) PCT Filed: Feb. 2, 2017

(86) PCT No.: PCT/GB2017/050255
§ 371 (c)(1),
(2) Date: Jul. 27, 2018

(87) PCT Pub. No.: WO2017/134438
PCT Pub. Date: Aug. 10, 2017

(65) Prior Publication Data
US 2019/0344293 A1 Nov. 14, 2019

(30) Foreign Application Priority Data
Feb. 5, 2016 (EP) ..................................... 16275021

(51) Int. Cl.
*B05B 7/04* (2006.01)
*B05B 12/00* (2018.01)
(Continued)

(52) U.S. Cl.
CPC .......... *B05B 7/0408* (2013.01); *B05B 12/004* (2013.01); *B05C 5/0216* (2013.01);
(Continued)

(58) Field of Classification Search
CPC ... B05B 7/0408; B05B 12/004; B05C 5/0216; B05C 17/0225; B25J 11/0075; B25J 15/0019
See application file for complete search history.

(56) References Cited

U.S. PATENT DOCUMENTS

| 4,848,606 | A | 7/1989 | Taguchi et al. |
| 5,348,585 | A | 9/1994 | Weston |

(Continued)

FOREIGN PATENT DOCUMENTS

| CN | 202752164 U | 2/2013 |
| CN | 103128028 A | 6/2013 |

(Continued)

OTHER PUBLICATIONS

International Search Report and Written Opinion of International Application No. PCT/GB2017/050255, dated Feb. 20, 2017, 11 pages.

(Continued)

*Primary Examiner* — Frederick C Nicolas
(74) *Attorney, Agent, or Firm* — Maine Cernota & Rardin

(57) ABSTRACT

An end effector for a robot having a threaded shaft; a motor coupled to the shaft and configured to rotate the shaft about its axis; a nut threaded onto the shaft; a feature for preventing the nut from rotating about the axis of the shaft; and an elongate member fixed at one end to the nut and extending from the nut in a direction parallel to the axis of the shaft. The end effector may further include a container for containing a fluid having an elongate body portion having an opening at one end; and a reciprocable plunger extending into an opposite end of the body portion. A second end of the elongate member may be coupled to the plunger.

15 Claims, 3 Drawing Sheets

(51) Int. Cl.
  *B05C 17/02* (2006.01)
  *B25J 15/00* (2006.01)
  *B25J 11/00* (2006.01)
  *B05C 5/02* (2006.01)

(52) U.S. Cl.
  CPC ....... *B05C 17/0225* (2013.01); *B25J 11/0075* (2013.01); *B25J 15/0019* (2013.01)

(56) References Cited

U.S. PATENT DOCUMENTS

| | | | |
|---|---|---|---|
| 5,464,128 A | 11/1995 | Keller | |
| 6,037,612 A * | 3/2000 | Nishimura | H01L 33/346 257/103 |
| 6,386,396 B1 * | 5/2002 | Strecker | G01F 13/005 222/145.6 |
| 6,523,992 B1 * | 2/2003 | Bublewitz | A61C 9/0026 222/145.6 |
| 6,932,237 B2 | 8/2005 | Heymann | A61C 9/0026 222/1 |
| 6,935,534 B2 * | 8/2005 | Strecker | B01F 7/00216 222/145.1 |
| 7,980,197 B2 * | 7/2011 | Prentice | B05C 5/0225 118/688 |
| 8,757,450 B2 * | 6/2014 | Huang | B05C 11/10 222/333 |
| 2010/0252574 A1 * | 10/2010 | Busin | A61C 9/0026 222/137 |
| 2013/0134187 A1 | 5/2013 | Huang | |

FOREIGN PATENT DOCUMENTS

| | | |
|---|---|---|
| JP | S57102260 A | 6/1982 |
| JP | H0977151 A | 3/1997 |
| WO | 2007003668 A1 | 1/2007 |

OTHER PUBLICATIONS

Extended European Search Report of European Application No. 16275021.0, dated Jul. 4, 2016, 7 pages.
Search Report under Section 17(5) of Great Britain Application No. GB1602115.6, dated Aug. 4, 2016, 4 pages.
Combined Search and Examination Report under Sections 17 and 18(3) of Great Britain Application No. GB 1701723.7, dated Jul. 19, 2017, 6 pages.
International Preliminary Report on Patentability for Appl No. PCT/GB2017/050255 dated Aug. 7, 2018, 7 pages.

* cited by examiner

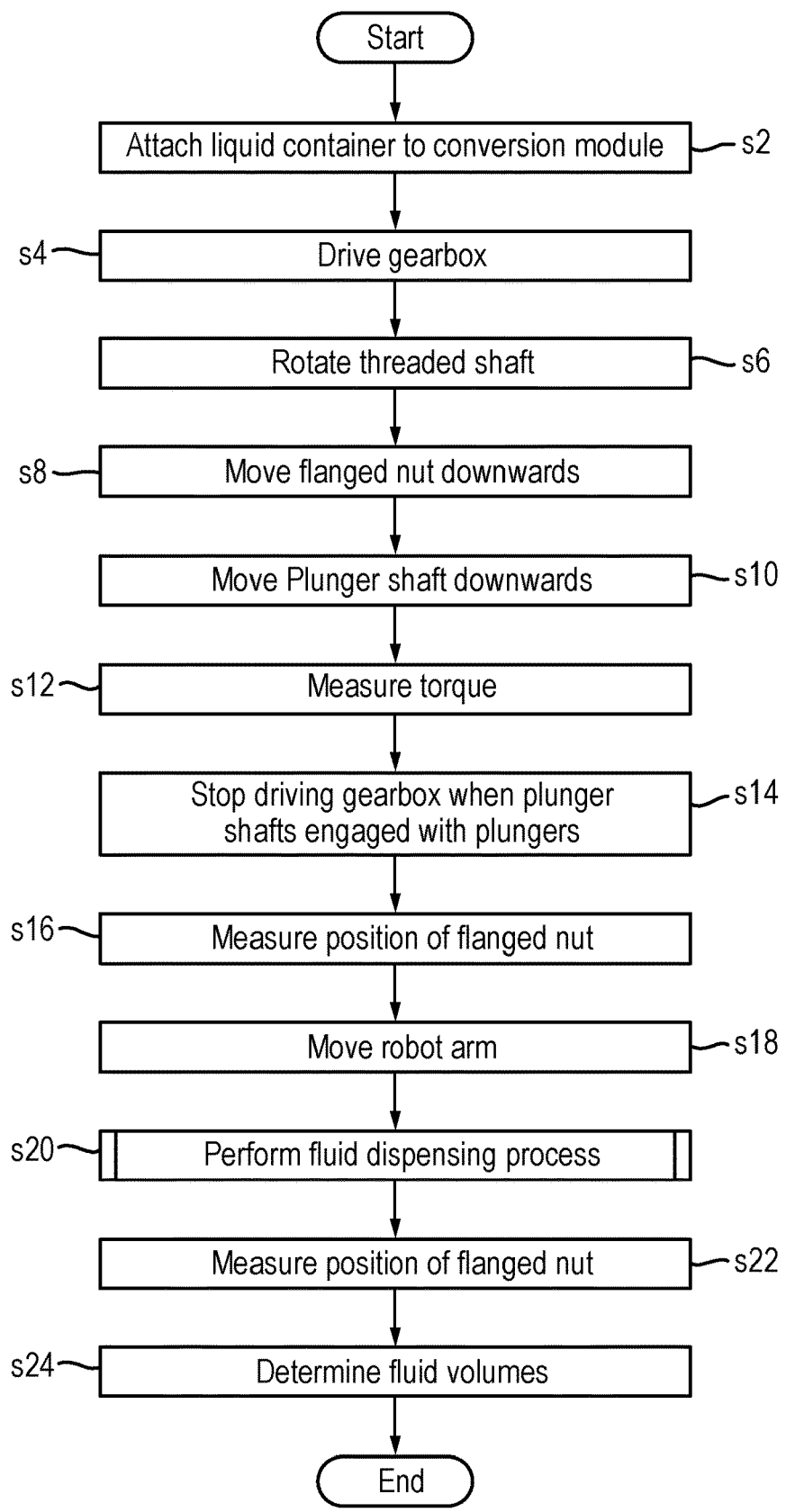

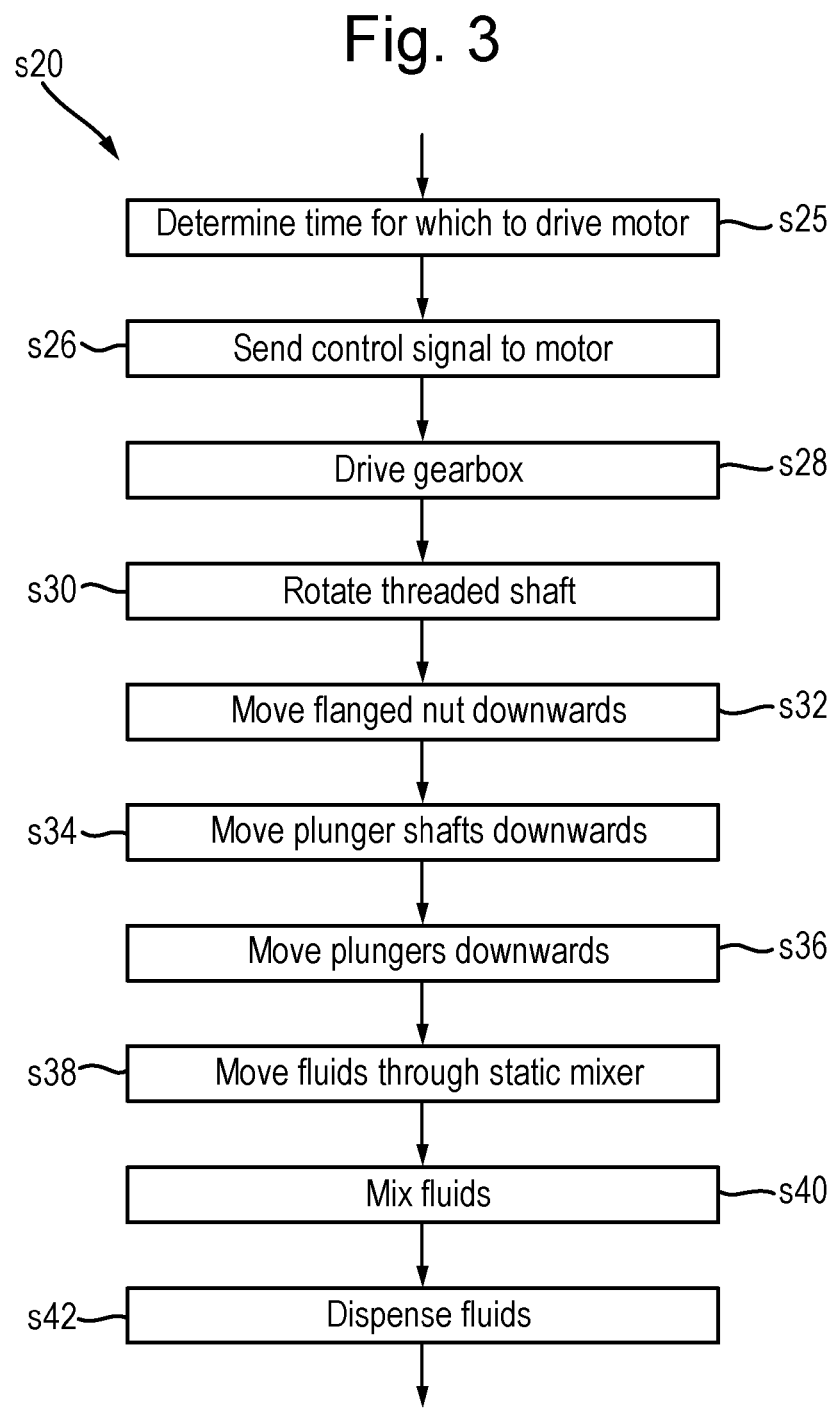

END EFFECTOR FOR A ROBOT

RELATED APPLICATIONS

This application is a national phase application filed under 35 USC § 371 of PCT Application No. PCT/GB2017/050255 with an International filing date of Feb. 2, 2017, which claims priority of GB Patent Application GB1602115.6 filed Feb. 5, 2016 and EP Patent Application EP16275021.0 filed Feb. 5, 2016. Each of these applications is herein incorporated by reference in its entirety for all purposes.

FIELD OF THE INVENTION

The present invention relates to end effectors suitable for use with robots and the control thereof, including end effectors for robot arms for dispensing fluids onto workpieces.

BACKGROUND

In dispensing a fluid such as adhesive or sealant which is made up of two components, it is common to direct the two fluids to a mixer and then to direct the mixed components to an outlet nozzle for dispensing the fluids.

Typically, in dispensing fluids, to dispense a quantity of a fluid a pressure is applied to a container of that fluid. Greater pressures are typically applied to dispense greater volumes of fluid, or dispense fluid at a higher rate.

Typically, where an accurate quantity of fluid is required, due to the lack of volume control, excess fluid is applied to a workpiece and excess fluid is subsequently removed.

SUMMARY OF THE INVENTION

The present inventor has realised that, in applying a given pressure to a container of a fluid, the volume of fluid dispensed from the container may vary, for example, due to the type of fluid, the viscosity of the fluid, how well a fluid comprising multiple parts is mixed, a fluid batch, environmental conditions, etc.

The present inventor has realised that it would be beneficial to provide an apparatus that provides improved accuracy of volume control in a dispensing fluid. The present inventor has realised that this would greatly facilitate automation.

In a first aspect, the present invention provides an end effector for a robot. The end effector comprises: a threaded shaft; a motor coupled to the threaded shaft and configured to rotate the threaded shaft about a longitudinal axis of the threaded shaft; a nut threaded onto the threaded shaft; means configured to prevent or oppose the nut from rotating about the longitudinal axis of the threaded shaft; and a first elongate member having a first end fixedly coupled to the nut and a second end opposite to its first end, the first elongate member extending from the nut in a direction that is substantially parallel to the longitudinal axis of the threaded shaft; a second elongate member having a first end fixedly coupled to the nut and a second end opposite to its first end, the second elongate member extending from the nut in a direction that is substantially parallel to the longitudinal axis of the threaded shaft; a first container for containing a first fluid, the first container comprising a first body portion comprising a first fluid discharge opening at or proximate to one end thereof, and a first reciprocable plunger extending into an end of the first body portion opposite to the end of the first body portion at or proximate to which the first fluid discharge opening is located, wherein the second end of the first elongate member is coupled to the first reciprocable plunger; a second container for containing a second fluid, the second container comprising a second body portion comprising a second fluid discharge opening at or proximate to one end thereof, and a second reciprocable plunger extending into an end of the second body portion opposite to the end of the second body portion at or proximate to which the second fluid discharge opening is located, wherein the second end of the second elongate member is coupled to the second reciprocable plunger; and a mixer (e.g. a static mixer) comprising: an inlet in fluid communication with each fluid discharge opening; an outlet; a channel between the inlet and the outlet through which a fluid may flow; and mixing means at least partially located in the channel and configured to mix together multiple fluids flowing through the channel.

The end effector may further comprise: an identifier associated with one or more of the containers; a sensor configured to measure the identifier; and one or more processors configured to control operation of the motor dependent upon a measurement of the identifier by the sensor.

The end effector may further comprise: at least one further elongate member, each further elongate member having a respective first end fixedly coupled to the nut and a respective second end opposite to the first end of the elongate member. Each elongate member may extend from the nut in a direction that is substantially parallel to the longitudinal axis of the threaded shaft.

The end effector may further comprise: at least one further container for containing a fluid. Each further container may comprise: an elongate further body portion comprising a further fluid discharge opening at or proximate to one end thereof; and a further reciprocable plunger extending into an end of that further body portion opposite to the end of that further body portion at or proximate to which that further fluid discharge opening is located. For each further container, the second end of a respective further elongate member may be coupled to the further plunger of that further container. The inlet of the mixer may be in fluid communication with each further fluid discharge opening.

The end effector may further comprise a torque sensor configured to measure a torque experienced by the motor.

The end effector may further comprise one or more position sensors configured to measure a position of the nut relative to the threaded shaft.

In a further aspect, the present invention provides a system comprising: an end effector for a robot according to any of the preceding aspects; and a controller configured to control the motor to rotate the threaded shaft.

The system may further comprise one or more processors configured to: acquire a value of a volume of a liquid to be dispensed; and determine, using the acquired volume value, a motor control parameter. The controller may be configured to control the motor to rotate the threaded shaft using the motor control parameter, thereby causing the nut to move relative to the threaded shaft in a direction along the longitudinal axis of the threaded shaft. For example, the one or more processors may be configured to: acquire a value of a volume of a liquid to be dispensed; determine, using the acquired volume value, a distance to move the nut relative to the threaded shaft in a direction along the longitudinal axis of the threaded shaft; and determine, using the determined distance, a rotation operation for the threaded shaft. The controller may be configured to control the motor to rotate the threaded shaft so as to perform the determined rotation operation, thereby causing the nut to move relative to the threaded shaft in a direction along the longitudinal axis of the threaded shaft by the determined distance.

The system may further comprise one or more processors configured to: acquire a value of a rate of a liquid to be dispensed; and determine, using the acquired rate value, a motor control parameter. The controller may be configured to control the motor to rotate the threaded shaft using the motor control parameter, thereby causing the nut to move relative to the threaded shaft in a direction along the longitudinal axis of the threaded shaft. For example, the one or more processors may be configured to: acquire a value of a rate of a liquid to be dispensed; determine, using the acquired rate value, a speed to move the nut relative to the threaded shaft in a direction along the longitudinal axis of the threaded shaft; and determine, using the determined distance, a rotation operation for the threaded shaft. The controller may be configured to control the motor to rotate the threaded shaft so as to perform the determined rotation operation, thereby causing the nut to move relative to the threaded shaft in a direction along the longitudinal axis of the threaded shaft at the determined speed.

In a further aspect, the present invention provides a method of providing an end effector for a robot. The method comprises: providing a threaded shaft; coupling a motor to the threaded shaft such that the motor is arranged to rotate the threaded shaft about a longitudinal axis of the threaded shaft; threading a nut onto the threaded shaft; coupling, to the nut and the threaded shaft, means for preventing or opposing the nut from rotating about the longitudinal axis of the threaded shaft; providing a first elongate member having a first end and a second end opposite to the first end; and fixedly coupling the first end of the first elongate member to the nut such that the first elongate member extends away from the nut in a direction that is substantially parallel to the longitudinal axis of the threaded shaft; providing a first container for containing a first fluid, the first container comprising a first body portion comprising a first fluid discharge opening at or proximate to one end thereof, and a first reciprocable plunger extending into an end of the first body portion opposite to the end of the first body portion at or proximate to which the first fluid discharge opening is located; fixedly coupling the second end of the first elongate member to the first reciprocable plunger; providing a second elongate member having a first end and a second end opposite to the first end; fixedly coupling the first end of the second elongate member to the nut such that the second elongate member extends away from the nut in a direction that is substantially parallel to the longitudinal axis of the threaded shaft; providing a second container for containing a second fluid, the second container comprising a second body portion comprising a second fluid discharge opening at or proximate to one end thereof, and a second reciprocable plunger extending into an end of the second body portion opposite to the end of the second body portion at or proximate to which the second fluid discharge opening is located; fixedly coupling the second end of the second elongate member to the second reciprocable plunger; providing a mixer comprising an inlet, an outlet, a channel between the inlet and the outlet through which a fluid may flow, and mixing means at least partially located in the channel and configured to mix together multiple fluids flowing through the channel; and arranging the inlet of the mixer in fluid communication with each fluid discharge opening.

In a further aspect, the present invention provides a method of controlling an end effector for a robot, the end effector being in accordance with any preceding aspect, the method comprising: rotating, by the motor, the threaded shaft about its longitudinal axis; and preventing or opposing the nut from rotating about the longitudinal axis of the threaded shaft, thereby causing the nut to move linearly along the threaded shaft, thereby causing the first and second elongate members to move in a direction that is substantially parallel to the longitudinal axis of the threaded shaft.

The method may further comprise: exerting a pushing force on the first and second plunger by the first and second elongate members respectively, thereby causing the first plunger to move a first fluid contained in the first container out of the first container via the first fluid discharge opening and into the mixer, and causing the second plunger to move a second fluid contained in the second container out of the second container via the second fluid discharge opening and into the mixer; and mixing, by the mixing means of the mixer, the first and second fluids moving through the mixer.

The method may further comprise: acquiring a value of a volume of a liquid to be dispensed; determining, using the acquired volume value, a motor control parameter; and controlling the motor to rotate the threaded shaft using the determine motor control parameter, thereby causing the nut to move relative to the threaded shaft in a direction along the longitudinal axis of the threaded shaft. For example, the method may further comprise: acquiring a value of a volume of a liquid to be dispensed; determining, using the acquired volume value, a distance to move the nut relative to the threaded shaft in a direction along the longitudinal axis of the threaded shaft; determining, using the determined distance, a rotation operation for the threaded shaft; and controlling the motor to rotate the threaded shaft so as to perform the determined rotation operation, thereby causing the nut to move relative to the threaded shaft in a direction along the longitudinal axis of the threaded shaft by the determined distance.

The method may further comprise: acquiring a value of a rate of a liquid to be dispensed; determining, using the acquired rate value, a motor control parameter; and controlling the motor to rotate the threaded shaft using the determine motor control parameter, thereby causing the nut to move relative to the threaded shaft in a direction along the longitudinal axis of the threaded shaft. For example, the method may further comprise: acquiring a value of a rate of a liquid to be dispensed; determining, using the acquired rate value, a speed to move the nut relative to the threaded shaft in a direction along the longitudinal axis of the threaded shaft; determining, using the determined distance, a rotation operation for the threaded shaft; and controlling the motor to rotate the threaded shaft so as to perform the determined rotation operation, thereby causing the nut to move relative to the threaded shaft in a direction along the longitudinal axis of the threaded shaft at the determined speed.

In a further aspect, the present invention provides an end effector for a robot comprising: a threaded shaft; a motor coupled to the threaded shaft and configured to rotate the threaded shaft about a longitudinal axis of the threaded shaft; a nut threaded onto the threaded shaft; means configured to prevent or oppose the nut from rotating about the longitudinal axis of the threaded shaft; and an elongate member having a first end fixedly coupled to the nut and a second end opposite to its first end, the elongate member extending from the nut in a direction that is substantially parallel to the longitudinal axis of the threaded shaft.

The end effector may further comprise: a container for containing a fluid. The container may comprising: an elongate body portion comprising a fluid discharge opening at or proximate to one end thereof; and a reciprocable plunger extending into an end of the body portion opposite to the end of the body portion at or proximate to which the fluid discharge opening is located. The second end of the elongate member may be coupled to the plunger.

The end effector may further comprise: an identifier associated with the container; a sensor configured to measure the identifier; and one or more processors configured to control operation of the motor dependent upon a measurement of the identifier by the sensor.

The end effector may further comprise: at least one further elongate member, each further elongate member having a respective first end fixedly coupled to the nut and a respective second end opposite to the first end of the elongate member. Each elongate member may extend from the nut in a direction that is substantially parallel to the longitudinal axis of the threaded shaft.

The end effector may further comprise: at least one further container for containing a fluid. Each further container may comprise: an elongate further body portion comprising a further fluid discharge opening at or proximate to one end thereof; and a further reciprocable plunger extending into an end of that further body portion opposite to the end of that further body portion at or proximate to which that further fluid discharge opening is located. For each further container, the second end of a respective further elongate member may be coupled to the further plunger of that further container.

The end effector may further comprise a mixer comprising: an inlet in fluid communication with each of the fluid discharge openings; an outlet; a channel between the inlet and the outlet through which a fluid may flow; and mixing means at least located in the channel configured to mix together multiple fluids flowing through the channel. The mixing means may be one or more protuberances extending inwards from the channel wall. In addition or alternatively, the mixing means may be one or more self-driven rotating mixer (which may be a disposable self-driven rotating mixer).

The end effector may further comprise a torque sensor configured to measure a torque experienced by the motor.

The end effector may further comprise one or more position sensors configured to measure a position of the nut relative to the threaded shaft.

In a further aspect, the present invention provides a system comprising: an end effector for a robot according to any of the preceding aspects; and a controller configured to control the motor to rotate the threaded shaft.

The system may further comprise one or more processors configured to: acquire a value of a volume of a liquid to be dispensed; and determine, using the acquired volume value, a motor control parameter. The controller may be configured to control the motor to rotate the threaded shaft using the motor control parameter, thereby causing the nut to move relative to the threaded shaft in a direction along the longitudinal axis of the threaded shaft. For example, the one or more processors may be configured to: acquire a value of a volume of a liquid to be dispensed; determine, using the acquired volume value, a distance to move the nut relative to the threaded shaft in a direction along the longitudinal axis of the threaded shaft; and determine, using the determined distance, a rotation operation for the threaded shaft. The controller may be configured to control the motor to rotate the threaded shaft so as to perform the determined rotation operation, thereby causing the nut to move relative to the threaded shaft in a direction along the longitudinal axis of the threaded shaft by the determined distance.

The system may further comprise one or more processors configured to: acquire a value of a rate of a liquid to be dispensed; and determine, using the acquired rate value, a motor control parameter. The controller may be configured to control the motor to rotate the threaded shaft using the motor control parameter, thereby causing the nut to move relative to the threaded shaft in a direction along the longitudinal axis of the threaded shaft. For example, the one or more processors may be configured to: acquire a value of a rate of a liquid to be dispensed; determine, using the acquired rate value, a speed to move the nut relative to the threaded shaft in a direction along the longitudinal axis of the threaded shaft; and determine, using the determined distance, a rotation operation for the threaded shaft. The controller may be configured to control the motor to rotate the threaded shaft so as to perform the determined rotation operation, thereby causing the nut to move relative to the threaded shaft in a direction along the longitudinal axis of the threaded shaft at the determined speed.

In a further aspect, the present invention provides a method of providing an end effector for a robot. The method comprises: providing a threaded shaft; coupling a motor to the threaded shaft such that the motor is arranged to rotate the threaded shaft about a longitudinal axis of the threaded shaft; threading a nut onto the threaded shaft; coupling, to the nut and the threaded shaft, means for preventing or opposing the nut from rotating about the longitudinal axis of the threaded shaft; providing an elongate member having a first end and a second end opposite to the first end; and fixedly coupling the first end of the elongate member to the nut such that the elongate member extends away from the nut in a direction that is substantially parallel to the longitudinal axis of the threaded shaft.

In a further aspect, the present invention provides a method of controlling an end effector for a robot. The end effector comprises: a threaded shaft; a motor coupled to the threaded shaft and configured to rotate the threaded shaft about a longitudinal axis of the threaded shaft; a nut threaded onto the threaded shaft; means configured to prevent or oppose the nut from rotating about the longitudinal axis of the threaded shaft; and an elongate member having a first end fixedly coupled to the nut and a second end opposite to its first end, the elongate member extending from the nut in a direction that is substantially parallel to the longitudinal axis of the threaded shaft. The method comprises: rotating, by the motor, the threaded shaft about its longitudinal axis; and preventing or opposing the nut from rotating about the longitudinal axis of the threaded shaft, thereby causing the nut to move linearly along the threaded shaft, thereby causing the elongate member to move in a direction that is substantially parallel to the longitudinal axis of the threaded shaft.

The end effector may further comprise: a container for containing a fluid, the container comprising: an elongate body portion comprising a fluid discharge opening at or proximate to one end thereof; and a reciprocable plunger extending into an end of the body portion opposite to the end of the body portion at or proximate to which the fluid discharge opening is located, wherein the second end of the elongate member is coupled to the plunger. The method may further comprise: exerting a pushing force on the plunger by the elongate member, thereby causing the plunger to move a fluid contained in the container out of the container via the fluid discharge opening.

The method may further comprise: acquiring a value of a volume of a liquid to be dispensed; determining, using the acquired volume value, a motor control parameter; and controlling the motor to rotate the threaded shaft using the determine motor control parameter, thereby causing the nut to move relative to the threaded shaft in a direction along the longitudinal axis of the threaded shaft. For example, the method may further comprise: acquiring a value of a volume of a liquid to be dispensed; determining, using the acquired volume value, a distance to move the nut relative to the threaded shaft in a direction along the longitudinal axis of the threaded shaft; determining, using the determined distance, a rotation operation for the threaded shaft; and controlling the motor to rotate the threaded shaft so as to perform the determined rotation operation, thereby causing the nut to move relative to the threaded shaft in a direction along the longitudinal axis of the threaded shaft by the determined distance.

The methods referred to above could also be considered methods for dispensing a liquid/fluid, wherein preferably the liquid/fluid has been pre-mixed in the apparatus/system of the present invention prior to being dispensed.

BRIEF DESCRIPTION OF THE DRAWINGS

FIG. 2 is a process flow chart showing certain steps of an embodiment of a process performed using the end effector; and FIG. 3 is a process flow chart showing certain steps of a fluid dispensing process performed during the process of FIG. 2.

DETAILED DESCRIPTION

Figure 1:
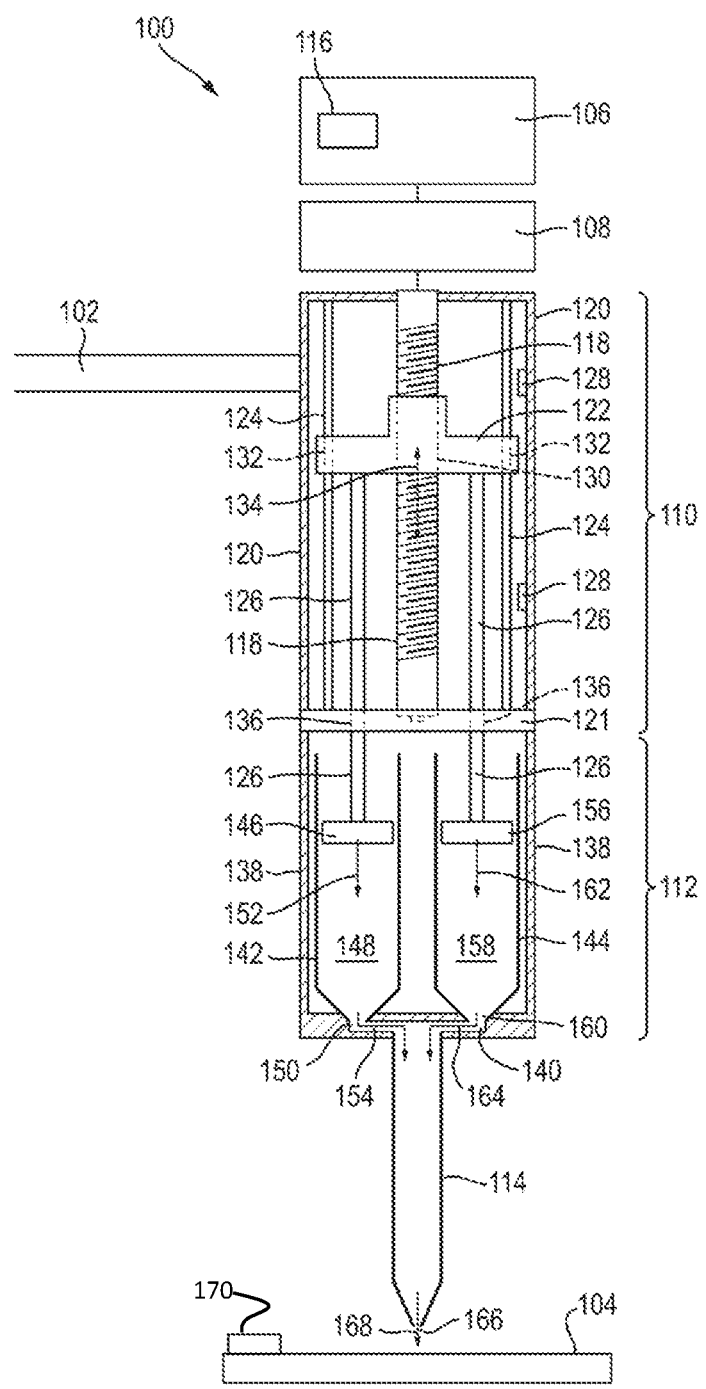
FIG. 1 is a schematic illustration (not to scale) of an embodiment of an end effector of a robot arm.

It will be appreciated that, in the below description, relative terms such as horizontal and vertical, top and bottom, above and below, front and back, and so on, are used merely for ease of reference to the Figures, and these terms are not limiting as such, and any two differing directions or positions and so on may be implemented rather than truly horizontal and vertical, top and bottom, and so on.

FIG. 1 is a schematic illustration (not to scale) of an embodiment of an end effector 100 of a robot arm 102. The end effector 100 is for dispensing a fluid on to a workpiece 104. In this embodiment, the fluid dispensed is an adhesive. An embodiment of a method of dispensing fluid by the end effector 100 onto the workpiece 104 is described in more detail later below with reference to FIGS. 2 and 3.

The terminology "end effector" may be used to refer to a part of a robot that interacts with a work environment, for example, a part of a robot that comprises a tool for processing a workpiece. Although in this embodiment, the end effector 100 is mounted to a robot arm 102, in other embodiments, the end effector 100 may be used with a different device or system, for example a different type of robot, or a movable gantry. In some embodiments, the end effector 100 may be stationary and the workpiece 104 may be moved relative to the end effector 100, for example, the workpiece 104 may be mounted to a table moveable in x, y, and z directions.

In this embodiment, the robot arm 102 is a conventional industrial robot arm having, for example, six degrees of freedom. The end effector 100 is attached to a free end of the robot arm 102. The robot arm 102 is configured to move the end effector 100 relative to the workpiece 104.

In this embodiment, the end effector 100 comprises a motor 106, a gearbox 108, a module configured to convert rotation motion to linear motion (hereinafter referred to as the "conversion module" and indicated by the reference numeral 110), a module containing the liquids to be dispensed (hereinafter referred to as the "liquid container" and indicated by the reference numeral 112), and a static mixer 114.

The motor 106 is a servomotor comprising a torque sensor 116 configured to measure a torque experienced by the motor 106. The motor 106 is coupled to the gearbox 108 such that the motor 106 may drive the gearbox 108.

Operation of the motor 106 is controlled by a controller (not shown in the Figures) that may be remote from the end effector 100.

The gearbox 108 is a planetary gear box. The gearbox 108 is coupled between the motor 106 and a threaded shaft 118 of the conversion module 110. The gearbox 108 comprises gears and gear trains arranged to use rotation motion of the motor 106 to rotate the threaded shaft 118 about its longitudinal axis.

The conversion module 110 comprises the threaded shaft 118, a first housing 120 having a base portion 121 at its bottom end, a flanged nut 122, a plurality of guide shafts 124, two plunger shafts 126, and a plurality of position sensors 128.

The first housing 120 is an elongate housing. A top end of the first housing 120 is coupled to the gearbox 108. A bottom end of the first housing 120 opposite to its top end is coupled to the liquid container 112. The base portion 121 is located at the bottom end of the first housing 120. The first housing 120 houses the threaded shaft 118, the flanged nut 122, the guide shafts 124, the plunger shafts 126, and the position sensors 128. The first housing 120 is mounted to the robot arm 102.

The threaded shaft 118 is an elongate shaft that is mounted in the first housing 120 such that the longitudinal axis of the threaded shaft 118 is substantially aligned along the length of the first housing 120, and such that the threaded shaft 118 extends between the top end and the bottom end of the first housing 120. The threaded shaft 118 is mounted in the first housing 120 such that the threaded shaft 118 is rotatable about its longitudinal axis relative to the first housing 120, for example by the action of the gearbox 108. Also, the threaded shaft 118 is mounted in the first housing 120 such that linear movement of the threaded shaft 118 relative to the first housing 120, for example in the direction of the longitudinal axis of the threaded shaft 118, is prevented or opposed.

The flanged nut 122 is mounted to the threaded shaft 118. In particular, in this embodiment, the flanged nut 122 comprises a central threaded through hole 130. The threaded through hole 130 has an internal thread that is complementary to the thread of the threaded shaft 118. The threaded shaft 118 is positioned through the through hole 130.

The flanged nut 122 further comprises a plurality of peripheral through holes 132. A respective guide shaft 124 passes through each of the peripheral through holes 132. In this embodiment, the guide shafts 124 fit tightly through the peripheral through holes 132 such that movement of the flanged nut 122 in a direction along the longitudinal axes of the guide shaft 124 is permitted, but that movement of the flanged nut 122 in other directions relative to the guide shaft 124 is prevented or opposed.

In this embodiment, each guide shaft 124 is an elongate shaft that is mounted in the first housing 120 such that the longitudinal axis of that guide shaft 124 is substantially parallel with that of the elongate first housing 120. Each guide shaft 124 extends between the top end and the bottom end of the first housing 120. The guide shafts 124 are fixedly mounted in the first housing 120 such that relative movement of the guide shafts 124 and the first housing is prevented or opposed. In other words, the guide shafts 124 are substantially immovable relative to the first housing 120.

In this embodiment, the guide shafts 124 being substantially immovable relative to the first housing 120 provide that rotation of the flanged nut 122 about its axis (i.e. about the longitudinal axis of the threaded shaft 118) is prevented or opposed. In other words, rotational movement of the flanged nut 122 relative to the first housing 120 is prevented or opposed. Thus, rotation of the threaded shaft 118 about its longitudinal axis causes the flanged nut 122 to move up or down the threaded shaft 118, as indicated in FIG. 1 by a double headed arrow and the reference numeral 134.

Thus, rotational movement of the threaded shaft 118 is converted to linear movement of the flanged nut 122 along the length of the threaded shaft 118.

In this embodiment, each plunger shaft 126 is an elongate shaft that is partially mounted in the first housing 120 such that the longitudinal axis of that plunger shaft 126 is substantially parallel with that of the elongate first housing 120. A top end of each plunger shaft 126 is fixedly attached to a bottom surface of the flanged nut 122. A bottom end of each plunger shaft 126 extends through a respective through hole 136 in the base portion 121 and into the liquid container 112. The plunger shafts 126 are fixedly attached to the flanged nut 122 such that movement of the plunger shafts 126 relative to the flanged nut 122 is prevented or opposed. Thus, movement of flanged nut 122 in a direction 134 along the longitudinal axis of the threaded shaft causes corresponding linear movement of the plunger shafts 126 along their respective longitudinal axes.

In this embodiment, the plunger shafts 126 fit tightly through the through holes 136 in the base portion 121 such that movement of the guide shafts 124 in directions along their respective longitudinal axes is permitted, but that movement of the plunger shafts 126 in other directions relative to the first housing 120 is prevented or opposed.

The position sensors 128 are configured to measure a position of the flanged nut 122 in the first housing 120. For example, the position sensors 128 may measure a position of the flanged nut 122 along the length of the threaded shaft 118. The position sensors 118 are coupled to one or more processors (not shown in the Figures) such that measurements taken by the positions sensors 128 may be sent to the one or more processors. The one or more processors may be remote from the end effector 100.

The liquid container 112 comprises a second housing 138 having a base portion 140 at its bottom end, a first cartridge 142, and a second cartridge 144.

The second housing 138 is an elongate housing. A top end of the second housing 138 is securely but removably attached to a bottom end of the first housing 120. The bottom end of the second housing 138, i.e. the base portion 140, is attached to a top end of the static mixer 114.

In this embodiment, the first and second cartridges 142, 144 are removably mounted inside the second housing 138 such that the longitudinal axes of the cartridges 142, 144 are substantially aligned with that of the second housing 138. Also, the first and second cartridges 142, 144 are mounted inside the second housing 138 such that each cartridge 142, 144 is substantially aligned with a respective plunger shaft 126.

The first cartridge 142 is an elongate container comprising a first plunger 146. The first plunger 146 is located at or proximate to a top end of the first cartridge 142. The first plunger 146 forms a closure of the open top end of the first cartridge 142. The walls of the first cartridge 142 and the first plunger 146 define a volume in which is contained a first fluid 148. In this embodiment, the first fluid 148 is a first part of a two-part adhesive.

The first cartridge 142 further comprises a first opening 150 located at a bottom of the first cartridge 142 through which the first fluid 148 may be caused to flow. The bottom end of the first cartridge 142 is fixed to the base portion 140 of the second housing 138 such that the first fluid 148 may flow from the first cartridge 142, through the first opening 150, and into the base portion 140.

In this embodiment, the first plunger 146 is movable within the first cartridge 142 along a longitudinal axis of the first cartridge 142. Also, a bottom end of a plunger shaft 126 is engaged with a top surface of the first plunger 146. Thus, the downwards movement of the plunger shafts 126 causes a plunger shaft 126 to push against the first plunger 146, and move the first plunger 146 downwards inside the first cartridge 142, as indicated in FIG. 1 by a solid arrow and the reference numeral 152. This downwards movement 152 of the first plunger 146 tends to pressurise the first fluid 148 within the first cartridge 142, and force an amount of the first fluid 148 out of the first cartridge 142 and into the base portion 140 via the first opening 150, as indicated in FIG. 1 by a solid arrow and the reference numeral 154.

The second cartridge 144 is an elongate container comprising a second plunger 154. The second plunger 154 is located at or proximate to a top end of the second cartridge 144. The second plunger 154 forms a closure of the open top end of the second cartridge 144. The walls of the second cartridge 144 and the second plunger 154 define a volume in which is contained a second fluid 158. In this embodiment, the second fluid 158 is a second part of the two-part adhesive. Mixing of the first fluid 148 and the second fluid 158 together forms an adhesive. Also, when mixed together, the first fluid 148 and the second fluid 158 chemically react with each other and cure to harden.

The second cartridge 144 further comprises a second opening 160 located at a bottom of the second cartridge 144 through which the second fluid 158 may be caused to flow. The bottom end of the second cartridge 144 is fixed to the base portion 140 of the second housing 138 such that the second fluid 158 may flow from the second cartridge 144, through the second opening 160, and into the base portion 140.

In this embodiment, the second plunger 154 is movable within the second cartridge 144 along a longitudinal axis of the second cartridge 144. Also, a bottom end of a plunger shaft 126 is engaged with a top surface of the second plunger 154. Thus, the downwards movement of the plunger shafts 126 causes a plunger shaft 126 to push against the second plunger 154, and move the second plunger 154 downwards inside the second cartridge 144, as indicated in FIG. 1 by a solid arrow and the reference numeral 162. This downwards movement 152 of the second plunger 154 tends to pressurise the second fluid 158 within the second cartridge 144, and force an amount of the second fluid 158 out of the second cartridge 144 and into the base portion 140 via the second opening 160, as indicated in FIG. 1 by a solid arrow and the reference numeral 164.

In some embodiments, one or more of the cartridges 142, 144 are integral with the base portion 140.

In this embodiment, a top end of the static mixer 114 is coupled to a bottom end of the base portion 140 of the second housing 138. The static mixer 114 is in fluid communication with the base portion 140.

The static mixer 114 comprises mixer element(s) that, as the first and second fluids 148, 158 flow through the static mixer 114 from the top of the static mixer 114 to the bottom of the static mixer 114, mix the first and second fluids 148, 158. The mixer elements are configured to provide that the first and second fluids 148, 158 are thoroughly mixed together at a point at or proximate to the bottom of the static mixer 114. The mixer elements may be one or more protuberances extending inwards from the mixer wall. In addition or alternatively, the mixer element(s) may be one or more self-driven rotating mixers (which may be disposable self-driven rotating mixers).

The static mixer 114 further comprises a dispensing hole 166 at the bottom end of the static mixer 114 from fluid flowing through the static mixer 114 is dispensed, as indicated in FIG. 1 by the solid arrow and the reference numeral 168.

Shown surrounding the cartridges 142, 144 is a heater element 170. This can be used to enable pre-frozen cartridges to be brought back to working temperature within the apparatus of the invention. Pre-frozen cartridges are usually sealants that instead of being mixed at point of use, are mixed by a supplier and are cryogenically frozen ready to be thawed (previously in a water bath prior to use) and then used in the standard methods described in the background.

FIG. 2 is a process flow chart showing certain steps of a process of dispensing a thoroughly mixed two-part adhesive onto the workpiece 104.

At step s2, the liquid container 112 is attached to the conversion module 110.

In particular, in this embodiment, the top of the second housing 138 is securely mounted to the base portion 121 of the first housing 120.

At step s4, the motor 106 is controlled to drive the gearbox 108.

At step s6, the gearbox 108 drives the threaded shaft 118. In particular, the gearbox 108 coverts rotation motion of the motor 106 into rotation motion of the threaded shaft 118. Thus, the threaded shaft 118 is rotated about its longitudinal axis relative to the first housing.

At step s8, the rotation of the threaded shaft 118 relative to the first housing causes the flanged nut 122 to move downwards in the housing, along at least a portion of the length of the threaded shaft 118, towards the base portion 121 of the first housing 120. The guide shafts 128 guide this downwards linear motion of the flanged nut 122 and present the flanged nut 122 from rotation about its axis relative to the first housing 120.

At step s10, the downwards movement of the flanged nut 122 causes the plunger shafts 126 to move downwards. Thus, the bottom ends of the plunger shafts are moved into the liquid container 112 to engage with respective plungers 146, 156.

At step s12, the torque sensor 116 measures a torque experienced by the motor 106 as the motor 106 drives the gearbox 108.

At step s14, the motor 106 is controlled to stop driving the gearbox 108 when a spike in the torque measured by the torque sensor 116 occurs. For example, the motor 106 may be controlled to stop driving the gearbox 108 when the torque measured by the torque sensor 116 at step s12 exceeds a predetermined threshold level.

In this embodiment, a spike in torque experienced by the motor 106 corresponds to the bottom ends the plunger shafts 126 being moved into contact with the upper surfaces of the plungers 146, 156.

At step s16, the position sensors 128 measure the position of the flanged nut 122 in the first housing 120. For example, the position sensors 128 may measure the position of the flanged nut 122 along the length of the threaded shaft 118.

In this embodiment, the positions sensors 128 send these first measurements of the position of the flanged nut 122 to a processor which may be remote from the end effector 100.

In some embodiments, instead of or in addition to steps s12 and/or s14, the motor 106 is driven until a quantity of fluid is dispensed from the dispensing hole 166. This tends to ensure that air is purged from the flow channel of the system prior to acting on the workpiece 104.

At step s18, the robot arm 102 is controlled to move the end effector 100 into a desired position relative to the workpiece 104. For example, the end effector 100 is moved to a position whereby the dispensing hole 166 of the static mixer 166 is at or proximate to a location on the workpiece 104 to which adhesive is to be applied.

At step s20, a fluid dispensing process is performed to dispense fluid adhesive from the end effector 100 onto the workpiece 104. The fluid dispensing process is described in more detail later below with reference to FIG. 3.

At step s22, the position sensors 128 measure the position of the flanged nut 122 in the first housing 120. Also, the positions sensors 128 send these second measurements of the position of the flanged nut 122 to the processor, similar to as performed at step s16.

At step s24, the processor receives and processes the position measurements received from the position sensors 128.

In particular, in this embodiment, the processor determines volumes of the first and second fluids 148, 158 dispensed during the fluid dispensing process of step s20. Also, the processor determines amounts of the first and second fluids 148, 158 remaining in the cartridges 142, 144.

In this embodiment, any appropriate process may be used by the processor to process the position measurements and determine fluid amounts.

In some embodiments, the processor determines volumes of the first and second fluids 148, 158 dispensed during the fluid dispensing process of step s20 as follows. The processor may determine or acquire a volume per unit time value, i.e. a volume of fluid dispensed per second of the motor 106 being driven. This volume per unit time value may be determined based on the dimensions of the cartridges 142, 144 and the plungers 146, 156. The processor may then, using the time for which the motor 106 was driven at step s20, and the acquired volume per unit time value, determine volumes of the first and second fluids 148, 158 dispensed during the fluid dispensing process of step s20.

In some embodiments, the processor determines volumes of the first and second fluids 148, 158 dispensed during the fluid dispensing process of step s20 as follows. Using the first and second position measurements of the flanged nut 122 taken at steps s16 and s22 respectively, the processor determines a vertical distance through which the flanged nut 122, and consequently the plunger shafts 126 and plungers 146, 156 have been moved during the during the fluid dispensing process of step s20. Using the dimensions of the cartridges 142, 144 and the plungers 146, 156, the processor then determines a volume through which plungers 146, 156 have been moved during the fluid dispensing process of step s20. Using these determined volumes, the processor determines the volumes of the first and second fluids 148, 158 expelled from the cartridges 142, 144 during the fluid dispensing process of step s20 (for example, the volumes moved through by the first and second plungers 146, 156 may be equal to the volumes of the first and second fluids 148, 158 expelled from the cartridges 142, 144 respectively). Using the determined volumes of the fluids 148, 158, the processor determines amounts of the fluids 148, 158 dispensed onto the workpiece 104 (for example, also using a known capacity of the static mixer 114 and base portion 140). In some embodiments, the processor also calculates the total amount of adhesive applied to the workpiece 104 (for example, by summing the determined amounts of the fluids 148, 158 dispensed onto the workpiece 104).

In some embodiments, the processor determines amounts of the first and second fluids 148, 158 remaining in the cartridges 142, 144 as follows. The processor acquires initial volumes of the fluids 148, 158 in their respective cartridges 142, 144 (i.e. volumes of the fluids 148, 158 in the cartridges before the fluid dispensing process is performed). These values may be acquired from suppliers or manufacturers of the filled cartridges 142, 144. The processor then subtracts the volumes of the first and second fluids 148, 158 expelled from the cartridges 142, 144 during the fluid dispensing process of step s20 from the respective initial volumes, thereby determining the volumes of the fluids 148, 158 remaining in the cartridges 142, 144.

By determining amounts of the first and second fluids 148, 158 remaining in the cartridges 142, 144 after the fluid dispensing operation, it can be determined whether or not there is enough of the fluids 148, 158 remaining to perform a subsequent fluid dispensing operation, or whether the cartridges should be replaced with full cartridges. Also, fluid dispensing operations for the end effector 100 may be scheduled such that the next operation is an operation for which there is sufficient of the fluids 148, 158 remaining in the cartridges 142, 144. Thus, unnecessary replacement of the cartridges tends to be avoided, and wastage of the fluids tends to be reduced.

Referring back to the description of step s20, FIG. 3 is a process flow chart showing certain steps of a fluid dispensing process performed at step s20.

In this embodiment, a predetermined amount of adhesive is to be applied to the workpiece 104.

At step s25, the processor determines a time for which to drive the motor 106 to provide that a predetermined amount of adhesive is applied to the workpiece 104.

For example, the processor determines an amount of the first fluid 148 and the second fluid 158 corresponding to the predetermined amount of adhesive to be applied to the workpiece 104. The processor may also determine or acquire a volume per unit time value, i.e. a volume of fluid dispensed onto the workpiece 104 by the system per second of the motor 106 being driven. Using these determined amounts of the fluids 148, 158, and the volume per unit time value, the processor determines time for which to drive the motor 106 to cause these determined amounts of the fluids 148, 158 to be expelled from the cartridges 142, 144 and dispensed from the static mixer 114.

At step s26, the motor controller sends a control signal the motor 106. The control signal is based on the time determined at step s25.

At step s28, the motor 106 is controlled by the control signal to drive the gearbox 108 for the determined time.

At step s30, the gearbox 108 drives the threaded shaft 118 for the determined time.

In particular, particular, the gearbox 108 coverts rotation motion of the motor 106 into rotation motion of the threaded shaft 118. Thus, the threaded shaft 118 is rotated about its longitudinal axis relative to the first housing.

At step s32, the rotation of the threaded shaft 118 relative to the first housing causes the flanged nut 122 to move downwards in the housing, along at least a portion of the length of the threaded shaft 118, towards the base portion 121 of the first housing 120, for the determined time. The guide shafts 128 guide this downwards linear motion of the flanged nut 122 and present the flanged nut 122 from rotation about its axis relative to the first housing 120.

In this embodiment, the control signal specifies motor operation that corresponds to the threaded shaft 118 being rotated for the time determined at step s25.

At step s34, the downwards movement of the flanged nut 122 causes the plunger shafts 126 to move downwards for the determined time.

At step s36, the downwards movement of the plunger shafts 126 causes the plungers 146, 156 to move downwards 152, 162 for the determined time.

At steps 38, the downwards movement 152, 162 of the plungers 146 for the determined time, 156 forces the determined amounts of the first fluid 148 and the second fluid 158 out of the first container 142 and the second container 144 respectively, and through the static mixer 114.

At step s40, as the first and second fluids 148, 158 move through the static mixer 114, the mixing elements in the static mixer 114 thoroughly mix together the first and second fluids 148, 158. The mixing together of the first and second fluids 148, 158 causes the first and second fluids 148, 158 to chemically react and the mixture begins to cure.

At step s50, the downwards movement 152, 162 of the plungers 146 for the determined time forces the predetermined amount of the adhesive (i.e. the mixture of the first and second fluids 148, 158) out of the dispensing holes 166 of the static mixer and onto the workpiece 104.

In other words, the downwards movement of the plungers 146, 148 for the time period determined at step s25 forces the determined amounts of the first and second fluids 148, 158 through the base portion 140, into the static mixer 114, through the static mixer 114 from the top of the static mixer 114 to the bottom of the static mixer 114, and through the dispensing hole 166.

Thus, a fluid dispensing process for dispensing a predetermined amount of thoroughly mixed two-part adhesive onto the workpiece 104 is provided.

Advantageously, the above described system and method tend to provide improved accuracy in fluid dispensing. For example, the above described system and method tend to provide improved accuracy compared to fluid dispensing systems that, to dispense a predetermined volume of a fluid, apply a given pressure to a container of that fluid. The above described system and method tends to be robust to changes in the type of fluid, the viscosity of fluid, how well a fluid comprising multiple parts is mixed, a fluid batch, environmental conditions, a state of the fluid, etc.

The above described system advantageously tends to have fewer losses than conventional systems, for example, those that dispense a predetermined amount of a fluid by applying a corresponding predetermined pressure to a container of that fluid.

Advantageously, the motor may be controlled with high accuracy to dispense a predetermined volume of fluid with high accuracy. For example, in the above described system and method, it is known that driving the motor with a given input signal causes the motor to rotate the threaded shaft a corresponding given number of rotations. It is also known, for example from the design of the threaded shaft and flanged nut, that a given number of rotations of the threaded shaft corresponds (deterministically) to a specific vertical movement of the flanged nut along the threaded shaft. It is also known, for example from the design of the cartridges and plungers, that a given vertical movement of the flanged nut along the threaded shaft corresponds (deterministically) to a specific volume of fluid dispensed.

Advantageously, the motor may be controlled with high accuracy to dispense fluid at a predetermined rate with high accuracy. For example, in the above described system and method, it is known that driving the motor with a given input signal causes the motor to rotate the threaded at a corresponding given rotational speed. It is also known, for example from the design of the threaded shaft and flanged nut, that a given rotational speed of the threaded shaft corresponds (deterministically) to a specific vertical speed of the flanged nut along the threaded shaft. It is also known, for example from the design of the cartridges and plungers, that a given vertical speed of the flanged nut along the threaded shaft corresponds (deterministically) to a specific fluid flow rate.

Advantageously, it tends to be possible to easily apply to the workpiece a bead of fluid having a predetermined thickness, for example by controlling the apparatus to dispense fluid at a particular flow rate, and by moving the end effector across the surface of the workpiece at a particular speed.

Advantageously, the above described method and apparatus tend to provide for improved control of fluid flow out of the fluid containers. In combination with the mixer, this improved control advantageously tends to provide that the flow of multiple fluids through the mixer can more precisely be controlled. Thus, improved control of the mixing of multiple different fluids tends to be provided. This advantageously tends to provide that the proportions of fluids being mixed can more precisely be controlled. Also, this advantageously tends to provide that parameters of the mixing process (e.g. time that different fluids spend mixing in the mixer, etc.) can more precisely be controlled. In embodiments in which the fluids being mixed form a multipart adhesive, curing tends to begin as soon as the component fluids come into contact with each other, i.e. are mixed by the mixer. The curing process may be time sensitive, with the multipart adhesive curing over time depending on the proportions of the component fluids. The improved control over the proportions of the component fluids, and the improved control over the parameters of the mixing process tend to reduce the likelihood of undesirable fluid proportions and undesirable fluid mixing. Undesirable fluid proportions and undesirable fluid mixing may cause premature or delayed curing of the multipart adhesive. Premature curing of the multipart adhesive (e.g. curing inside the mixer) may cause blockages. Also, delayed curing of the multipart adhesive may cause problems such as weak bonding and delays in assembly of systems. Advantageously, improved control of the mixing of fluid components of a multipart adhesive tends to reduce a need for maintenance and repair of the apparatus.

Advantageously, parameters such as the speed and force of the flow of multiple component fluids through the mixer tend to be optimisable for mixing.

Advantageously, using the above described apparatus and method it tends to be possible to dispense a multipart adhesive at an optimum point in its curing process.

Furthermore, a calibration process may be performed to calibrate the above described apparatus. For example, for a given motor control signal, the amount of fluid dispensed can be measured. A sequence of these measurements may be used to calibrate the system. The above described system advantageously tends to be easy to calibrate.

Advantageously, the position sensors may be used to provide for improved safety. For example, the position sensors may measure the position of the flanged nut inside the housing, and these measurements may be used to ensure that the plungers are not driven too far downwards, for example beyond the bottom ends of the cartridges.

Advantageously, a system pressure relief may be implemented at the end of a dispensing routine to move the plunger shafts upwards slightly, thereby limiting additional unintended dispensing of the fluids due to residual pressure in the system.

It should be noted that certain of the process steps depicted in the flowcharts of FIGS. 2 and 3 and described above may be omitted or such process steps may be performed in differing order to that presented above and shown in FIGS. 2 and 3. Furthermore, although all the process steps have, for convenience and ease of understanding, been depicted as discrete temporally-sequential steps, nevertheless some of the process steps may in fact be performed simultaneously or at least overlapping to some extent temporally.

In the above embodiments, the apparatus includes two fluid containing cartridges, and two corresponding plungers and plunger shafts. However, in other embodiments, the apparatus includes a different number of fluid containing cartridges. In other embodiments, the apparatus includes a different number of plunger shafts and/or plungers. For example, in some embodiments, the apparatus includes only a single fluid containing cartridge and only a single plunger and plunger shaft to act on that single cartridge e.g. with a single nozzle of varying profile for the purposes of application without mixing. In some embodiments, a single plunger shaft may act on multiple cartridges at the same time. In other words, the present invention may be used to dispense a single liquid/fluid (e.g. sealant, adhesive) from a single cartridge. However, preferably the present invention is used to dispense a single liquid/fluid (e.g. sealant, adhesive) from multiple (e.g. two or more) cartridges.

In the above embodiments, the fluid dispensed is a two-part adhesive that is mixed together prior to dispensing. The adhesive may be an adhesive used in bonded fastener systems such as Clickbond® (e.g. CB200 which is a two part acrylic thixotropic paste). However, in other embodiments the fluid dispensed is a different type of fluid, for example, a one-part fluid, a sealant, or a liquid shim.

In some embodiments which include multiple liquid containing cartridges, the diameters and/or volumes of those cartridges may be different. The relative diameters of the cartridges may define the proportions in which the different fluids contained in those cartridges are combined.

In some embodiments, the apparatus further includes a sensing device or similar configured to detect the type, size, etc. of cartridges that are installed in the apparatus. These determined properties of the cartridges may be used to select appropriate input signals for controlling the motor. For example, in some embodiments, each cartridge or cartridge unit (which may for example comprise multiple cartridges e.g. coupled to a common base plate) include an identifier 170 by which that cartridge or unit can be identified. Example identifiers 170 include, but are not limited to, a radio-frequency identification (RFID) tag. The apparatus may include a device for sensing the identifier 170. The apparatus may select appropriate control signals for the end effector based on the detected identifier 170, for example, from a look-up table.

In the above embodiments, the apparatus comprises a static mixer for mixing together the first and second fluids. However, in other embodiments, the apparatus comprises a different type of mixer. In other embodiments, a mixer is omitted, for example, the apparatus may simultaneously dispense multiple different fluids in an unmixed or partially mixed form.

In some embodiments, the system comprises a control panel or other means for switching the system between a manual mode and an automatic mode. The system may also comprise a switch, button or other means for switching the system into and out of a "purge mode". In its purge module, the system continues to purge (i.e. to move the plungers downwards so as to expel air/fluid from the system) until the system is switched out of its purge mode. In some embodiments, the switch, button or other means for switching the system into and out of a "purge mode" is only operable when the system is in manual mode. In some embodiments, when the system is in automatic mode, the processor may control the end effector in accordance with a preprogramed purge routine to purge the system.

In some embodiments, when a fluid dispensing process is completed, or one or more of the fluid cartridges are empty, the plunger shafts are retracted.

In some embodiments, when a fluid cartridge is empty, an error flag may be generated and the robot and end effector are stopped. The empty cartridge can then be removed and replaced. Preferably, whenever fluid dispensing is stopped, the plunger shafts are retracted at least a small distance to allow any residual pressure/compression of the cartridge to be released. Upon system restart, the plunger shafts may be initially moved back through this small distance to the cartridges.

Adhesives tend to have specific times before they solidify sufficiently to become hard or impossible to dispense. Such "cure times" are preferably part of programs run by the processor for controlling the end effector. Also, for example if a fluid dispensing process is stopped before a cartridge is empty, the processor may measure a time for which the fluid has been curing/hardening. In some embodiments, if a fluid dispensing process is stopped before a cartridge is empty, if the amount of time a fluid has been curing equals or exceeds a cure time for that fluid, the processor may generate an error flag to indicate that the cartridge should be replaced. However, if the amount of time a fluid has been curing is less than the cure time for that fluid, a fluid dispensing process may be begun or resumed.

Advantageously, the processor tends to know, or may determine using sensor measurements, positions of the plunger shafts, even in the event of power loss.

In some embodiments, a program for dispensing fluid from a cartridge or group of cartridges includes data on the maximum and/or minimum torque for dispensing those fluids. In some embodiments, if either or both of these torque limits is exceeded, the fluid dispensing process may be stopped. An error flag may be generated, for example, to inform an operator that an inspection of the system, or a cartridge replacement, is to be carried out. For example, the maximum torque limit being exceeded may be indicative of one or more of the following events: the adhesive may have solidified unusually early; the cartridge may be damaged; or adhesive may have escaped and caused a blockage. The minimum torque limit not being met may be indicative of one or more of the following events: a drive belt, or drive pulley may have slipped/jumped or become damaged; or there may be an air bubble/pocket in the cartridge.

In addition to the claimed subject matter in the appended claims, the following clauses may serve as basis for additional claims in this application:

1. An end effector (100) for a robot, the end effector (100) comprising:
   a threaded shaft (118);
   a motor (106) coupled to the threaded shaft (118) and configured to rotate the threaded shaft (118) about a longitudinal axis of the threaded shaft (118);
   a nut (122) threaded onto the threaded shaft (118);
   means (124) configured to prevent or oppose the nut (122) from rotating about the longitudinal axis of the threaded shaft (118); and
   an elongate member (126) having a first end fixedly coupled to the nut (122) and a second end opposite to its first end, the elongate member (126) extending from the nut (122) in a direction that is substantially parallel to the longitudinal axis of the threaded shaft (118).

2. An end effector (100) for a robot according to clause 1, further comprising:
   a container (142) for containing a fluid (148), the container (142) comprising:
     an elongate body portion comprising a fluid discharge opening (150) at or proximate to one end thereof; and
     a reciprocable plunger (146) extending into an end of the body portion opposite to the end of the body portion at or proximate to which the fluid discharge opening (150) is located; wherein
   the second end of the elongate member (126) is coupled to the plunger (146).

3. An end effector (100) for a robot according to clause 2, further comprising:
   an identifier associated with the container (142);
   a sensor configured to measure the identifier; and
   one or more processors configured to control operation of the motor (106) dependent upon a measurement of the identifier by the sensor.

4. An end effector (100) for a robot according to any of clauses 1 to 3, further comprising:
   at least one further elongate member (126), each further elongate member (126) having a respective first end fixedly coupled to the nut (122) and a respective second end opposite to the first end of the elongate member (126); wherein
   each elongate member (126) extends from the nut (122) in a direction that is substantially parallel to the longitudinal axis of the threaded shaft (118).

5. An end effector (100) for a robot according to clause 4, further comprising:
   at least one further container (144) for containing a fluid (158), each further container (144) comprising:
     an elongate further body portion comprising a further fluid discharge opening (160) at or proximate to one end thereof; and
     a further reciprocable plunger (156) extending into an end of that further body portion opposite to the end of that further body portion at or proximate to which that further fluid discharge opening (160) is located; wherein
   for each further container (144), the second end of a respective further elongate member (126) is coupled to the further plunger (156) of that further container (144).

6. An end effector (100) for a robot according to clause 5, further comprising:

a mixer (114) comprising:
  an inlet in fluid communication with each fluid discharge opening (150, 160);
  an outlet (166);
  a channel between the inlet and the outlet (166) through which a fluid may flow; and
  mixing means at least partially located in the channel and configured to mix together multiple fluids flowing through the channel.
7. An end effector (100) for a robot according to any of clauses 1 to 6, further comprising a torque sensor (116) configured to measure a torque experienced by the motor (106).
8. An end effector (100) for a robot according to any of clauses 1 to 7, further comprising one or more position sensors (128) configured to measure a position of the nut (122) relative to the threaded shaft (118).
9. A system comprising:
  an end effector (100) for a robot according to any of clauses 1 to 8; and
  a controller configured to control the motor (106) to rotate the threaded shaft (118).
10. A system according to clause 9, further comprising:
  one or more processors configured to:
  acquire a value of a volume of a liquid to be dispensed; and
  determine, using the acquired volume value, a motor control parameter; wherein
  the controller is configured to control the motor to rotate the threaded shaft (118) using the motor control parameter, thereby causing the nut (122) to move relative to the threaded shaft (118) in a direction along the longitudinal axis of the threaded shaft (118).
11. A system according to clause 9 or 10, further comprising:
  one or more processors configured to:
  acquire a value of a rate of a liquid to be dispensed; and
  determine, using the acquired rate value, a motor control parameter; wherein
  the controller is configured to control the motor (106) to rotate the threaded shaft (118) using the motor control parameter, thereby causing the nut (122) to move relative to the threaded shaft (118) in a direction along the longitudinal axis of the threaded shaft (118).
12. A method of providing an end effector (100) for a robot, the method comprising:
  providing a threaded shaft (118);
  coupling a motor (106) to the threaded shaft (118) such that the motor (106) is arranged to rotate the threaded shaft (118) about a longitudinal axis of the threaded shaft (118);
  threading a nut (122) onto the threaded shaft (118);
  coupling, to the nut (122) and the threaded shaft (118), means (124) for preventing or opposing the nut (122) from rotating about the longitudinal axis of the threaded shaft (118);
  providing an elongate member (126) having a first end and a second end opposite to the first end; and
  fixedly coupling the first end of the elongate member (126) to the nut (122) such that the elongate member (126) extends away from the nut (122) in a direction that is substantially parallel to the longitudinal axis of the threaded shaft (118).
13. A method of controlling an end effector (100) for a robot, the end effector (100) comprising: a threaded shaft (118); a motor (106) coupled to the threaded shaft (118) and configured to rotate the threaded shaft (118) about a longitudinal axis of the threaded shaft (118); a nut (122) threaded onto the threaded shaft (118); means (124) configured to prevent or oppose the nut (122) from rotating about the longitudinal axis of the threaded shaft (118); and an elongate member (126) having a first end fixedly coupled to the nut (122) and a second end opposite to its first end, the elongate member (126) extending from the nut (122) in a direction that is substantially parallel to the longitudinal axis of the threaded shaft (118), the method comprising:
  rotating, by the motor (106), the threaded shaft (118) about its longitudinal axis; and
  preventing or opposing the nut (122) from rotating about the longitudinal axis of the threaded shaft (118), thereby causing the nut (122) to move linearly along the threaded shaft (118), thereby causing the elongate member (126) to move in a direction that is substantially parallel to the longitudinal axis of the threaded shaft (118).
14. A method according to clause 13, the end effector (100) further comprising: a container (142) for containing a fluid (148), the container (142) comprising: an elongate body portion comprising a fluid discharge opening (150) at or proximate to one end thereof; and a reciprocable plunger (146) extending into an end of the body portion opposite to the end of the body portion at or proximate to which the fluid discharge opening (150) is located, wherein the second end of the elongate member (126) is coupled to the plunger (146), the method further comprising:
  exerting a pushing force on the plunger (146) by the elongate member (126), thereby causing the plunger (146) to move a fluid (148) contained in the container (142) out of the container (142) via the fluid discharge opening (150).
15. A method according to clause 13 or 14 further comprising:
  acquiring a value of a volume of a liquid to be dispensed;
  determining, using the acquired volume value, a motor control parameter; and
  controlling the motor (106) to rotate the threaded shaft (118) using the determined motor control parameter, thereby causing the nut (122) to move relative to the threaded shaft (118) in a direction along the longitudinal axis of the threaded shaft (118).

The invention claimed is:
1. An end effector for a robot arm, the end effector comprising:
  a threaded shaft;
  a motor coupled to the threaded shaft and configured to rotate the threaded shaft about a longitudinal axis of the threaded shaft;
  a nut threaded onto the threaded shaft;
  means configured to prevent or oppose the nut from rotating about the longitudinal axis of the threaded shaft; and
  a first elongate member having a first end fixedly coupled to the nut and a second end opposite the first end, the first elongate member extending from the nut in a direction that is parallel to the longitudinal axis of the threaded shaft;
  a second elongate member having a first end fixedly coupled to the nut and a second end opposite the first end, the second elongate member extending from the nut in a direction that is parallel to the longitudinal axis of the threaded shaft;
  a first container for containing a first fluid, the first container comprising a first body portion comprising a first fluid discharge opening at or proximate to one end thereof, and a first reciprocable plunger extending into an end of the first body portion opposite to the end of the first body portion at or proximate to which the first fluid discharge opening is located, wherein the second end of the first elongate member is coupled to the first reciprocable plunger;

a second container for containing a second fluid, the second container comprising a second body portion comprising a second fluid discharge opening at or proximate to one end thereof, and a second reciprocable plunger extending into an end of the second body portion opposite to the end of the second body portion at or proximate to which the second fluid discharge opening is located, wherein the second end of the second elongate member is coupled to the second reciprocable plunger; and a mixer comprising:

an inlet in fluid communication with each fluid discharge opening;

an outlet in fluid communication with the inlet; and mixing means disposed between the inlet and outlet wherein the mixing means is configured to mix together multiple fluids flowing between the inlet and the outlet.

2. The end effector for a robot arm according to claim 1, further comprising:
an identifier associated with one or more of the containers;
a sensor configured to measure the identifier; and
one or more processors configured to control operation of the motor dependent upon a measurement of the identifier by the sensor.

3. The end effector for a robot arm according to claim 1, further comprising:
at least one further elongate member, each further elongate member having a respective first end fixedly coupled to the nut and a respective second end opposite to the first end of the elongate member; wherein each elongate member extends from the nut in a direction that is parallel to the longitudinal axis of the threaded shaft.

4. The end effector for a robot arm according to claim 3, further comprising:
at least one further container for containing a fluid, each further container comprising:
an elongate further body portion comprising a further fluid discharge opening at or proximate to one end thereof; and
a further reciprocable plunger extending into an end of the further body portion opposite to the end of the further body portion at or proximate to which the further fluid discharge opening is located;
wherein, for said each further container, the second end of a respective further elongate member is coupled to the further plunger of the further container.

5. The end effector for a robot arm according to claim 4, wherein the inlet of the mixer is in fluid communication with each further fluid discharge opening.

6. The end effector for a robot arm according to claim 1, further comprising a torque sensor configured to measure a torque experienced by the motor.

7. The end effector for a robot arm according to claim 1, further comprising one or more position sensors configured to measure a position of the nut relative to the threaded shaft.

8. A system comprising:
an end effector for a robot arm according to claim 1; and
a controller configured to control the motor to rotate the threaded shaft.

9. The system according to claim 8, further comprising:
one or more processors configured to:
acquire a value of a volume of a liquid to be dispensed; and
determine, using the acquired volume value, a motor control parameter;
wherein the controller is configured to control the motor to rotate the threaded shaft using the motor control parameter, thereby causing the nut to move relative to the threaded shaft in a direction along the longitudinal axis of the threaded shaft.

10. The system according to claim 8, further comprising:
one or more processors configured to:
acquire a value of a rate of a liquid to be dispensed; and
determine, using the acquired rate value, a motor control parameter;
wherein the controller is configured to control the motor to rotate the threaded shaft using the motor control parameter, thereby causing the nut to move relative to the threaded shaft in a direction along the longitudinal axis of the threaded shaft.

11. A method of providing an end effector for a robot arm, the method comprising:
providing a threaded shaft;
coupling a motor to the threaded shaft such that the motor is arranged to rotate the threaded shaft about a longitudinal axis of the threaded shaft;
threading a nut onto the threaded shaft;
coupling, to the nut and the threaded shaft, means for preventing or opposing the nut from rotating about the longitudinal axis of the threaded shaft;
providing a first elongate member having a first end and a second end opposite to the first end; and
fixedly coupling the first end of the first elongate member to the nut such that the first elongate member extends away from the nut in a direction that is parallel to the longitudinal axis of the threaded shaft;
providing a first container for containing a first fluid, the first container comprising a first body portion comprising a first fluid discharge opening at or proximate to one end thereof, and a first reciprocable plunger extending into an end of the first body portion opposite to the end of the first body portion at or proximate to which the first fluid discharge opening is located;
fixedly coupling the second end of the first elongate member to the first reciprocable plunger;
providing a second elongate member having a first end and a second end opposite to the first end;
fixedly coupling the first end of the second elongate member to the nut such that the second elongate member extends away from the nut in a direction that is parallel to the longitudinal axis of the threaded shaft;
providing a second container for containing a second fluid, the second container comprising a second body portion comprising a second fluid discharge opening at or proximate to one end thereof, and a second reciprocable plunger extending into an end of the second body portion opposite to the end of the second body portion at or proximate to which the second fluid discharge opening is located;
fixedly coupling the second end of the second elongate member to the second reciprocable plunger;
providing a mixer comprising an inlet and an outlet in fluid communication and mixing means disposed between the inlet and outlet, wherein the mixing means is configured to mix together multiple fluids flowing between the inlet and the outlet; and
arranging the inlet of the mixer in fluid communication with each fluid discharge opening.

12. A method of controlling an end effector for a robot arm, the end effector being in accordance with claim 1, the method comprising:
- rotating, by the motor, the threaded shaft about the longitudinal axis; and
- preventing or opposing the nut from rotating about the longitudinal axis of the threaded shaft, thereby causing the nut to move linearly along the threaded shaft, thereby causing the first and second elongate members to move in a direction that is parallel to the longitudinal axis of the threaded shaft.

13. The method according to claim 12, the method further comprising:
- exerting a pushing force on the first and second plunger by the first and second elongate members respectively, thereby causing the first plunger to move a first fluid contained in the first container out of the first container via the first fluid discharge opening and into the mixer, and causing the second plunger to move a second fluid contained in the second container out of the second container via the second fluid discharge opening and into the mixer; and
- mixing, by the mixing means of the mixer, the first and second fluids moving through the mixer.

14. The method according to claim 12 further comprising:
- acquiring a value of a volume of a liquid to be dispensed;
- determining, using the acquired volume value, a motor control parameter; and
- controlling the motor to rotate the threaded shaft using the determined motor control parameter, thereby causing the nut to move relative to the threaded shaft in a direction along the longitudinal axis of the threaded shaft.

15. The method according to claim 12 further comprising:
- acquiring a value of a rate of a liquid to be dispensed;
- determining, using the acquired rate value, a motor control parameter; and
- controlling the motor to rotate the threaded shaft using the determined motor control parameter, thereby causing the nut to move relative to the threaded shaft in a direction along the longitudinal axis of the threaded shaft.

* * * * *